United States Patent [19]

Newman

[11] Patent Number: 5,287,452
[45] Date of Patent: Feb. 15, 1994

[54] BUS CACHING COMPUTER DISPLAY SYSTEM

[75] Inventor: Gary H. Newman, Concord, Mass.

[73] Assignee: Eastman Kodak Company, Rochester, N.Y.

[21] Appl. No.: 498,031

[22] Filed: Mar. 23, 1990

[51] Int. Cl.$^5$ ............................................. G06F 15/00
[52] U.S. Cl. ..................................... 395/166; 395/164;
395/400; 395/162; 345/200
[58] Field of Search ............................... 395/164–166,
395/163, 162, 325, 155, 400, 425; 340/798, 799, 750

[56] References Cited

U.S. PATENT DOCUMENTS

| | | | |
|---|---|---|---|
| 4,439,760 | 3/1984 | Fleming | 340/799 |
| 4,481,576 | 11/1984 | Bicknell | 395/425 |
| 4,533,942 | 8/1985 | Gall et al. | 358/160 |
| 4,545,068 | 10/1985 | Tabata et al. | 395/164 |
| 4,618,858 | 10/1986 | Belch | 340/799 |
| 4,620,289 | 10/1986 | Chauvel | 395/164 |
| 4,633,415 | 12/1986 | Vink et al. | 395/134 |
| 4,653,012 | 3/1987 | Duffy et al. | 395/164 |
| 4,679,038 | 7/1987 | Bantz et al. | 340/799 |
| 4,703,317 | 10/1987 | Shiomi et al. | 340/747 |
| 4,729,028 | 3/1988 | Micic et al. | 358/183 |
| 4,739,405 | 4/1988 | Sumida | 358/160 |
| 4,779,135 | 10/1988 | Judd | 358/183 |
| 4,799,146 | 1/1989 | Chauvel | 395/325 |
| 4,891,768 | 1/1990 | Willems et al. | 395/164 |
| 4,945,499 | 7/1990 | Asari et al. | 395/164 |
| 4,953,101 | 8/1990 | Kelleher et al. | 364/900 |
| 5,046,023 | 9/1991 | Katsura et al. | 395/166 |

Primary Examiner—Dale M. Shaw
Assistant Examiner—Kee M. Tung
Attorney, Agent, or Firm—Milton S. Sales

[57] ABSTRACT

A display system for connection to a bus in a digital processing system having a system memory. The display system comprises a display memory, a display and an interface. The display memory stores image data. The display receiving stored image data from the display memory and generates in response thereto a displayed image. The interface receiving image data and address signals from the bus, the signals corresponding to addresses in the system memory. In response to the address signals, the interface determines whether the image data relates to image data for an image stored in said display memory and in response thereto controls storage of the image data in the display memory.

32 Claims, 3 Drawing Sheets

BUS CACHING COMPUTER DISPLAY SYSTEM

INCORPORATION BY REFERENCE

U.S. patent application Ser. No. 07/300,783, filed Jan. 23, 1989, entitled "Virtual Memory Management Arrangement For Addressing Multi-Dimensional Arrays In A Digital Data Processing System," in the name of Gary H. Newman and assigned to the assignee of the present application, incorporated herein by reference.

FIELD OF THE INVENTION

The invention relates generally to the field of digital computers and more particularly to computer video display systems.

BACKGROUND OF THE INVENTION

Digital computers are often used to process and manipulate images. The images may be photographic, if generated externally from the computer, from, for example, a photograph. Alternatively, an image may be graphic, that is, generated entirely by the computer under control of a program or an operator. In either case, the computer may be used to modify the image, for example rotate or process the image, to enhance it or to provide additional information relating to the image to the viewer on a display screen.

A typical image comprises a plurality of picture elements, termed "pixels" or "pels," with the pixels comprising the smallest element of an image which may be processed or displayed. Each pixel is represented by a digital data word, having a selected number of bits, which represents a color or gray scale value (i.e., intensity) of the pixel. Generally, the image is stored in a video memory array of n×m words, where "n" and "m" identify the number of pixels in each row and column in a rectangular image. To display the image, the digital data words are sequentially read row by row from the video memory array and converted to analog form for display by the video display.

The video display generally has to be refreshed periodically, typically every one-thirtieth of a second, and so each location in the video memory array must be accessed at the same rate. The refresh is required by the video display memory hardware and cannot be interrupted without disrupting the displayed image. Problems arise if the digital image data stored in the video memory array is also used for the computations required for the processing of the image, since video memory accesses requested by the processor must be delayed if the video memory array is contemporaneously being accessed for the video display refresh. Since image processing is generally computationally intensive, such delays in servicing access requests by the processor will delay processing, potentially significantly degrading performance of the system.

Although there are display systems which include both a separate display memory which holds the image data to be displayed and an image memory which holds the image data to be processed, these systems have the disadvantage that the processed image data in the image memory must be copied into the display memory when the image data in the image memory is changed during processing. However, in this arrangement the processor may also be delayed while the image memory is being accessed to obtain image data for transfer to the display memory.

SUMMARY OF THE INVENTION

The invention provides a new and improved display system which avoids these problems while providing a separate display and system memory.

In brief summary, the invention provides a display system for connection to a bus in a digital processing system including a system memory. The display system comprises a display memory, a display and an interface. The display memory stores image data. The display, receiving stored image data from the display memory, generates in response thereto a displayed image. The interface receives image data and address signals from the bus. In response to this address data, which indicates addresses of the system memory in the system, the interface determines whether the image data relates to image data for an image stored in said display memory and in response thereto controls storage of the image data in the display memory. It should be noted that the words system memory mean, in this context, any memory in the system other than the display memory.

More specifically, the invention provides an improved system for displaying an image in a computer system in such a manner as to not interfere with the access to a system memory by a CPU even during refresh or update operations to the display memory. The system monitors the bus which interconnects the display memory, the processor, and the system memory. When locations in the system memory, which hold the image data during processing by the processor, are written to by the processor, the display system updates its copy of the image data by receiving and storing the image data that is being written to the system memory. It does this contemporaneously with storage of the same data by the system memory. This allows the display memory to be updated simultaneously with the system memory without requiring extra operations by the processor or extra traffic over the bus as is often required with other systems.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
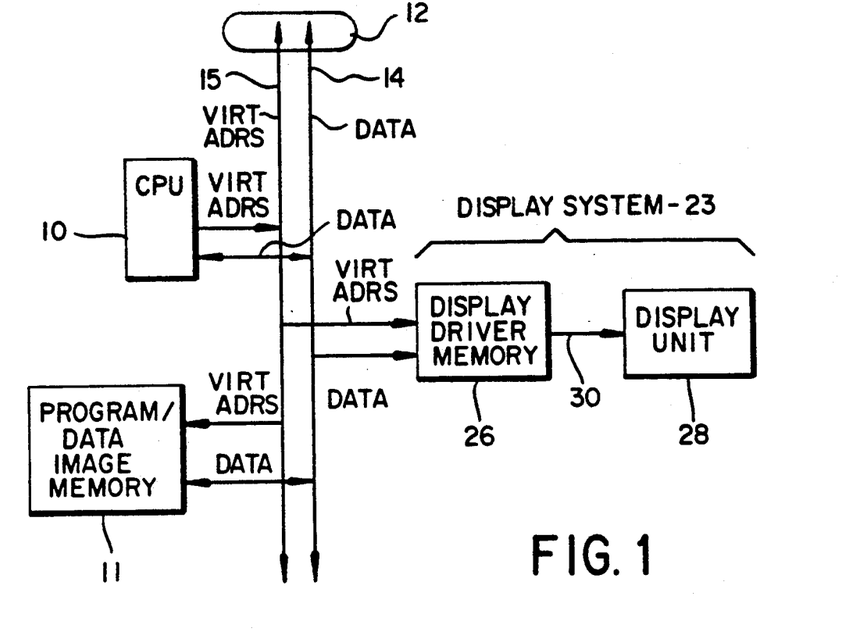
FIG. 1 is a block diagram of a computer system including a display system constructed in accordance with the invention.

Referring to FIG. 1, in brief overview, a processor (CPU) 10 processes image data stored in a memory 11, in response to a program and non-image data also stored in memory 11. The processor 10 retrieves image data from, and writes image data to, the memory 11 across a bus 12, which, in one particular embodiment, comprises a VME bus. The processor 10 also reads program instructions and non-image data from, and may also write non-image data to memory 11.

In one embodiment, to initiate an operation with memory 11, the processor 10 generates and transmits VIRT ADRS virtual address signals identifying a particular virtual storage location in a virtual address space. The image data is stored in a predetermined portion of the processor's virtual address space, and the program instructions and non-image data are stored in other portions of the virtual address space.

If the processor is accessing the memory 11 to store image data therein, it also transmits DATA signals representing the image data to be stored over lines 14 of the bus 12, but if it is accessing the memory 11 to retrieve image data therefrom, the memory transmits DATA signals over the same lines 14. It will be appreciated that the processor 10 will also transmit conventional bus control signals to control transfers over bus 12. The memory 11 may include a memory mapping unit, similar to that described in the aforementioned Newman application, to convert the image virtual addresses to physical addresses to identify particular physical storage locations (not shown) in the memory 11.

Before proceeding further, since the computer system depicted in FIG. 1 includes the image virtual memory management arrangement disclosed in the aforementioned U.S. patent application Ser. No. 07/300,783 (the "Newman application"), it would be helpful to describe the virtual memory management arrangement as disclosed therein. In that arrangement, data arranged in a multi-dimensional array is divided into sub-arrays each having a predetermined number of data items along each dimension. In a two-dimensional array in the arrangement described in the Newman application, a sub-array corresponds to a tile in two dimensional image data in the system described here, a tile comprising the minimum unit of transfer between secondary storage and physical memory 11 during a swapping operation. In one specific embodiment, each pixel in an array of image data is identified by a virtual address comprising a predetermined number of bits identifying the virtual location of the pixel in the vertical direction, and a number of bits identifying the virtual location of the pixel in the horizontal direction, the number being fixed for each image but variable between images. Each tile contains 64K ("K"=1024 virtual storage locations) pixels organized in a 256-pixel by 256-pixel array; thus, within each tile, each pixel may be identified by an eight-bit portion identifying the offset into the tile of a pixel in the vertical direction and a second eight-bit portion identifying the offset into the tile of the pixel in the horizontal direction.

Each tile also has a virtual address identifying the offset, from a base virtual address, of the tile into the image data, with each tile having a virtual address including a variable-bit portion identifying the offset into the image data of the tile in the vertical direction and a portion comprising a variable number of bits identifying the offset into the image data of the tile in the horizontal direction. The number of bits comprising the horizontal offset of the tile into the image data, which also identifies the number of tiles in the horizontal direction of an image, that is, its horizontal tile dimension, is related to bits 8 to N of the virtual address, where $2^{(N-8)}$ is the number of the tile in the horizontal direction.

In that embodiment, the image data is stored in a 1G ("G"=1,073,741,824 virtual storage locations) portion of a process's virtual address space, which in turn is divided into two hundred and fifty-six 4M ("M"=1,048,576 virtual storage locations) segments, and the high-order portion of the virtual address also identifies one or more successive segments of virtual address space which contains the image data. Thus, since the segment identifier, that is, the high-order portion of the virtual addresses for the pixels in an image, indirectly identifies the number of tiles in the horizontal direction in an image, which is related to the number of horizontal address bits, those numbers will be the same for all images which may be stored in a segment.

With this background, the computer system depicted in FIG. 1 also includes a display system 23 for displaying images to an operator representative of selected image data. The display system 23 comprises a display driver 26 which stores image data and converts it to a video signal for transmission over line 30 for display by a display unit 28. The display driver will be described further below in connection with FIGS. 2, et seq. Briefly, the virtual address space may store a number of images, only one or a selected number of which may be displayed at one time by display system 23. Whenever the processor 10 is storing image data in a location in memory 11 for an image that the display system 23 is displaying, the display memory 26 can copy the data from the bus 12 and use it in its image display operations.

The display system 23 will only update its image in memory if the command being sent to the system memory is a read request, a write request, or a read and write request. Further, the display system only updates the image in its memory if the location being written in system memory 11, as identified by the VIRT ADRS virtual address signals on line 15 of bus 12, corresponds to a virtual address range for the image being displayed by the display system 23. In this way, the processor 10 may simultaneously update the memory 11 and display system 23. The display system can also be disabled to not respond to address data on the bus 12.

Figure 2:
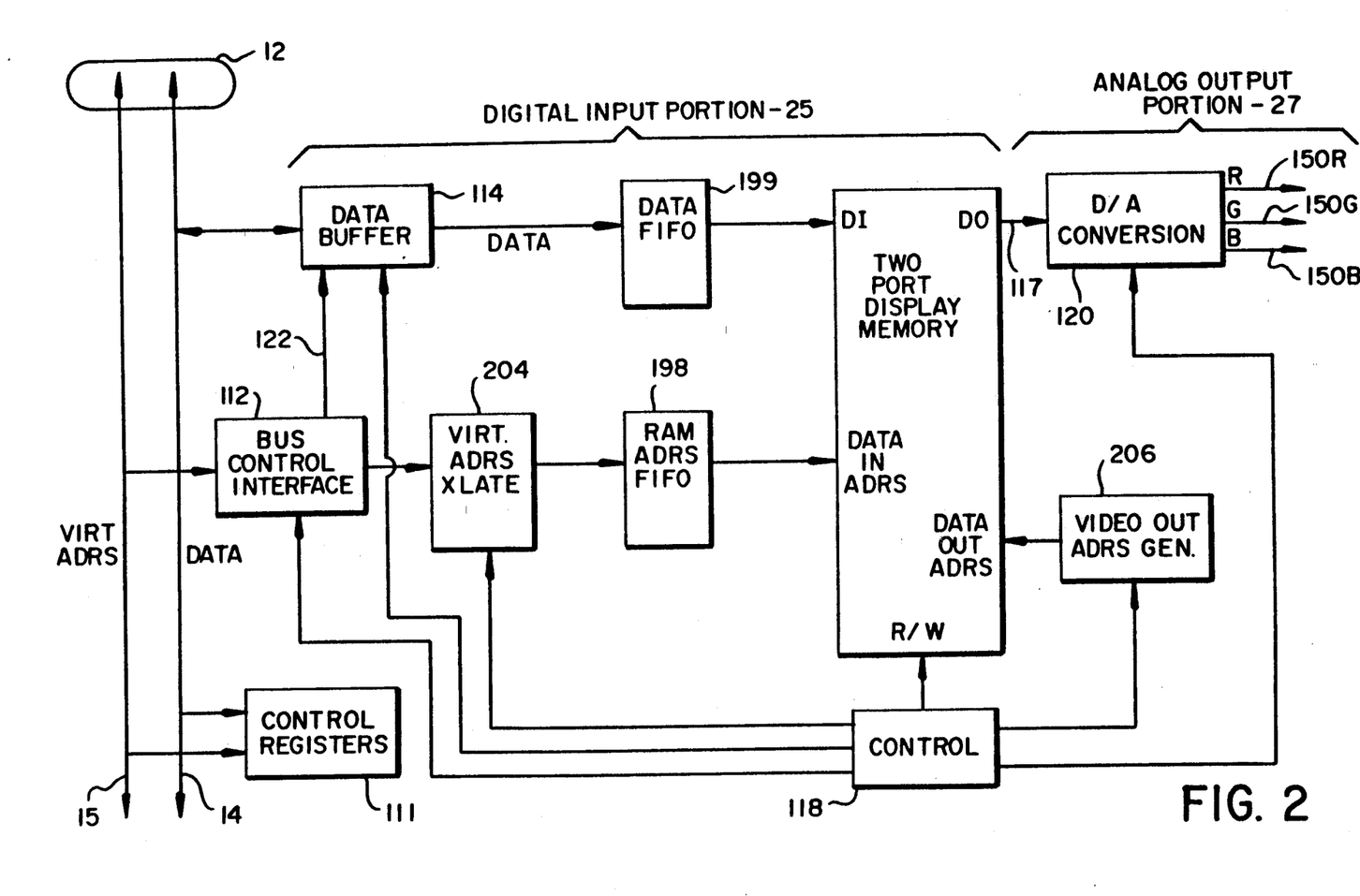
FIG. 2 is a block diagram of a display driver useful in the display system depicted in FIG. 1.

Referring also to FIG. 2, the display system 23 in one embodiment is divided into two general sections, namely, a digital input portion 25 and an analog output portion 27. The primary function of the digital input portion 25 is to transfer data from the bus 12 in selected regions of the image portion of the virtual address space, which corresponds to an image being displayed, and to store the image data in a display memory 116. The primary function of the analog output portion 27 is to convert the data in the display memory 116 into analog video signals, in one embodiment in RGB format, which can be displayed by the display unit 28.

The digital input portion 25, which is shown in FIG. 2, comprises a bus control interface 112 that monitors the address 15 and control lines of the bus 12 for addresses in a selected region of the virtual address space. When the bus control interface 112 detects such an address, and if the address meets certain other criteria, described below, it generates a signal on line 122 that enables a data buffer 114 to latch DATA signals on data lines 14 and transfer the data into a data first-in-first-out buffer, DATA FIFO 199 for storage in memory 116. In addition, the bus watcher couples the virtual address to an address translation circuit 204 which generates a physical address, which is stored in a address first-in-first-out buffer, ADRS FIFO 198 to identify a storage location in a display memory 116, which comprises a dual port random access memory, in which the data latched by data buffer 114 is to be stored. The use of the buffers 198, 199 effectively decouples the display memory 116 from the bus 12. A video control circuit 118 controls storage of the received image data in the display memory 116. The image data contained in the memory unit 116 is read therefrom through an output port DO 117 under control of the video control circuit 118 and addresses from the address generator 206 for transmission to a digital to analog conversion circuit 120 in the analog output portion 27. The digital to analog conversion circuit 120, if necessary, converts the digital formatted data into digital RGB formatted data on separate R (red), G (green) and B (blue) lines 150(R), 150(G) and 150(B), respectively, for transmission to the display unit 28.

The display driver also has a control register circuit 111 which includes an interface to bus 12 to receive therefrom data for storage in a set of control registers in a conventional manner. The control registers control a number of the other components in the display system 23 as described below.

The detailed structure and operation of the display system 23, in particular the digital input portion 25, will now be described in more detail. Referring initially to FIG. 2, which provides an overview of the digital input portion 25, the digital input portion 25 provides a source of addresses for locations in display memory 116. As noted above, the bus control interface 112, which is described below in greater detail in connection with FIG. 3, supplies addresses in response to VIRT ADRS virtual addresses from the bus 12 corresponding to a selected region of the virtual address space, that is, a region corresponding to an image being displayed by the display system 23. When bus watcher 112 detects such an address, it enables data buffer 114 to latch the data on lines 14 of the bus 12, and couples the image virtual address to an address translator 204, which, in turn, generates an address, which is stored in the address buffer ADRS FIFO 198, identifying a location in display memory 116. The address translator 204 will be described further below in connection with FIG. 4.

A video address generator 206 is the second source of address signals. The video address generator 206 determines the order in which data is read from the display memory 116 in a conventional manner.

Figure 3:
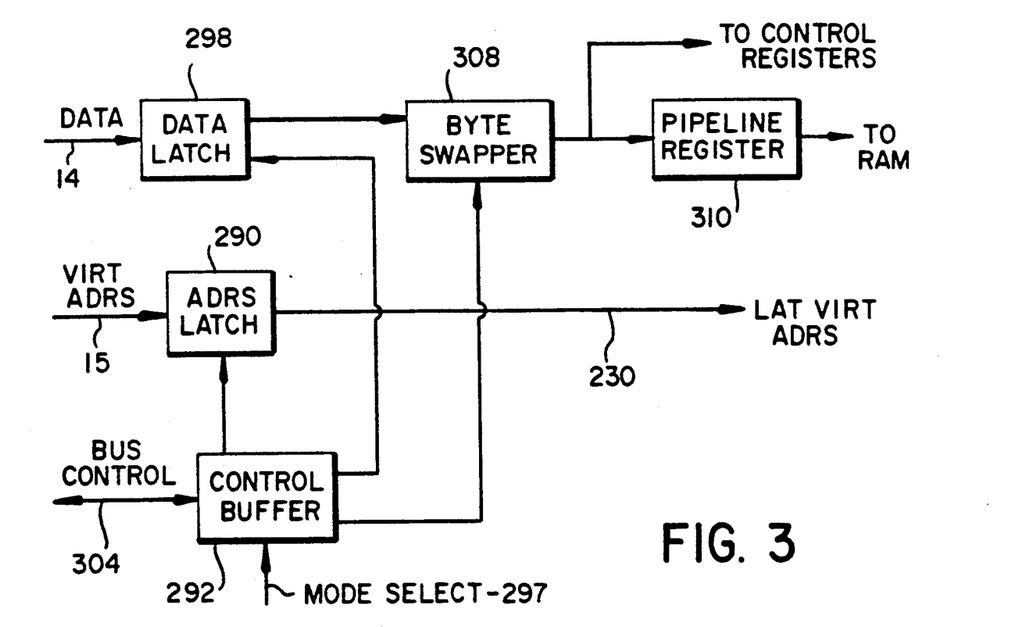
FIG. 3 is a block diagram of the data buffer and bus control interface portions of the digital input portion shown in FIG. 2.

A detailed functional block diagram of bus watcher 112 and data buffer 114 is depicted in FIG. 3. With reference to FIG. 3, the bus control interface 112 includes an address latch 290 to latch VIRT ADRS virtual address signals from bus 12 in response to a signal from a control circuit 292, which, in turn, operates in response to bus control signals on lines 304. The control circuit 292 also generates response and other control signals for transmission over bus control lines 304, the signals depending on the condition of a mode select value on mode select line 297. The mode select value is provided by a control and status register (not shown) in control registers 111.

The particular sequencing of control signals to control transfers of data and addresses over bus 12 depends on the particular type of bus, and its specification, comprising bus 12, and will not be described here. Since, as described above, the display system 23 operates as a cache on the bus 12, caching image data while the processor 10 is accessing memory 11 if the VIRT ADRS virtual address is in a selected range, the memory 11 will normally generate response control signals and transmit them over control lines (not shown) in the bus to the processor 10. The response control signals may indicate, for example, that it received data transmitted over data lines 14 by the processor 10 and stored t hem in a location identified by the VIRT ADRS virtual address signals.

Alternatively, the response control signals may indicate that the memory 11 is transmitting DATA signals over data lines 14 during a retrieval operation initiated by processor 10. In addition, the response control signals may indicate an error, to enable the processor to, for example, retry an access operation. However, since these response control signals are generated by the memory 11, normally the bus watching logic 112 will not generate them. However, once a response control signal has been asserted by the memory 11, the bus watching logic 112 may maintain it asserted, to effectively extend the assertion, to prevent further data transfer across the bus until display system 23 is has finished its own operations in connection with the image data on the bus 12.

Referring further to FIG. 3, to enable the processor 10 to perform diagnostics in connection with the display system 23, it will be appreciated that the display system 23, in particular the control buffer 292 may generate and transmit the response control signals over bus 12, while contemporaneously enabling transmission of data over the data lines 14 on bus 12 to the processor for examination in connection with a diagnostic program. Diagnostic mode operation may be identified by a selected mode select value on line 297, which enables the bus watching logic to generate and transmit the response control signals which may be required by bus 12.

The data buffer 114 latches DATA signals on lines 14 of bus 12 whenever control signals over bus 12 indicate that lines 14 contain data. The data buffer 114 includes latching transceivers 298, which receives the DATA signals, a byte swapper 308, which swaps the bytes comprising the DATA signals under control of the control buffer 292, and a register 310 for storing the output of the byte swapper 308. The byte swapper 308 is used if, for example, during byte and double byte transfers the low-order sixteen data bits contain data, to swap the data bits to appropriate lines so that they may be properly stored in the display memory 116. The output of the byte swapper 308 may be coupled to the control registers 111 (FIG. 2) if the VIRT ADRS virtual address on lines 14 identify a register thereof.

Figure 4:
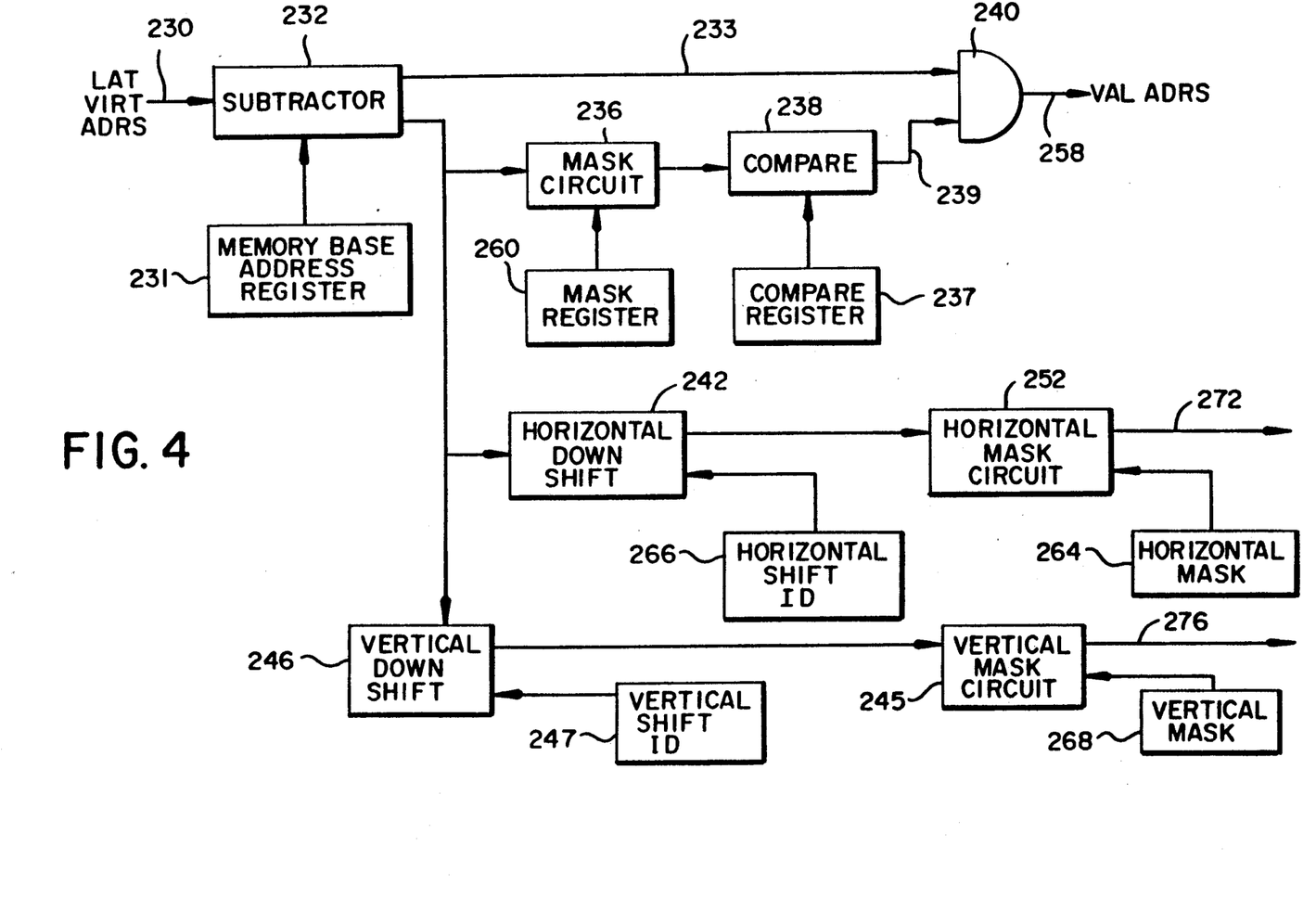
FIG. 4 is a block diagram of an address translation circuit useful in the digital input portion shown in FIG. 2.

As noted above, if the bus control interface 112 determines that the VIRT ADRS virtual address signals on lines 15 of bus 12 identify a location in a region of the image portion of the virtual address space associated with an image being displayed, it, in particular the address translator 204, generates a physical address to identify a storage location in display memory 116. FIG. 4 depicts a detailed functional block diagram of the address translator 204. With reference to FIG. 4, the address translator 204 comprises four general portions. A first portion, comprising a subtractor 232, determines whether the address value represented by the VIRT ADRS virtual address latched by address latch 290 (FIG. 3) is above a base address for the image being displayed by the display system 23. If so, another portion of the address translator 204, comprising mask circuit 236, a comparison circuit 238 and an AND gate 258, determines whether the displacement virtual address value is (1) below a maximum value of the virtual address space comprising the image, and (2) also whether the pixel defined by the VIRT ADRS virtual address is being displayed by the display system. The display system may display a "decimated" image comprising only selected pixel patterns, such as every other pixel, every fourth pixel, and so forth, in both the horizontal and vertical direction, which is defined by a mask in a mask register 260 in control registers 111 (FIG. 2). The mask circuit 236 performs a mask operation using the mask to determine whether the display system is displaying the pixel identified by the VIRT ADRS virtual address. If so, and if the VIRT ADRS virtual address is within the range of virtual addresses of the image being displayed by the display system, as determined by the comparator 238, the AND gate 240 asserts a VAL ADRS valid address signal on a line 258.

Two other portions generate the horizontal and vertical addresses for the image being displayed, which essentially define column and row addresses, respectively, for the storage locations in the dual port memory 116. As is apparent from the above description in connection with the aforementioned Newman application, the horizontal address comprises a variable number of low order bits of the displacement virtual address value received from subtractor 232, and the vertical address comprises a fixed number of intermediate bits. The horizontal address generating portion generally comprises a down shifter 242 and a mask circuit 252. Similarly, the vertical address generator generally comprises a down shifter 246, and mask circuit 245.

The detailed operation of the address translator 204 will be described in connection with FIG. 4. As noted above, the first and second portions of the address translator 204 jointly determine if the address on the bus corresponds to the range of virtual addresses containing image data for the image being displayed by the display system. If the image is not decimated, that is, if the display system 23 is displaying pixels defined by all of the virtual address values in the VIRT ADRS virtual address range defining the image, the bus address is compared to the starting and ending address of the image in memory. If the bus address is not within this range, the data is ignored, and nothing further occurs. The starting virtual address of the first pixel displayed in the display memory is stored in the memory base address register 231. The memory base address register 231 contains the image virtual address of the first pixel of the image being displayed. This value is subtracted by subtractor 232 from the VIRT ADRS virtual address on line 230 latched in the latch 290. If a borrow results, as indicated by a negated signal on line 233, the bus address is less than the starting address as stored in the memory base address register, and the address is ignored.

If no borrow results, the subtractor 232 generates an asserted signal on line 233, and a displacement virtual address value which it transmits to mask circuit 236. In that case, the displacement address is masked by mask circuit 236 with the contents of a address mask register 260 in control registers 111. In this operation, the mask circuit 236 performs a bit-wise AND operation in connection with the bits defining the displacement virtual address value and the mask. A comparator 238 determines whether the mask operation results in a value equal to that in the compare register 237, and, if so, the pixel identified by the VIRT ADRS virtual address is one of the pixels being displayed by the display system 23.

For non-decimated images, the mask need only enable the mask circuit 236 to check the high-order bits of the horizontal and vertical virtual address, defining tiles as described in the above-identified Newman application, to determine if the bus address is within the range of addresses being displayed. For decimated images, the mask also identifies the low-order address bits, in both the horizontal and vertical directions, defining the pixel patterns to be displayed. AND gate 240 performs a Boolean AND operation on the negated borrow signal on line 233 and the result of the compare operation on line 239 and generates an asserted signal on the line 258 if the latched VIRT ADRS virtual address identifies a pixel being displayed. The VAL ADRS valid address signal determines whether to store the associated image data in the display memory 116.

Once the AND gate 240 indicates whether the display system 23 is displaying the pixel identified by the IM VIRT ADRS image virtual address on bus 12, the horizontal and vertical addresses are generated by the respective generation portions. The VIRT ADRS virtual address received from bus 12 contains both the horizontal and vertical addresses, and so the respective horizontal and vertical addresses must be generated independently. This is done by taking the displacement address on line 244 from the subtracter 232, shifting and masking the difference to separate the horizontal and vertical addresses to separately generate the horizontal and vertical address values.

To separate the horizontal and vertical address values, the displacement virtual address value on line 244 is independently coupled to horizontal and vertical down shifters 242 and 246. The horizontal down shifter 242 shifts the displacement address on line 244 to the right to generate the horizontal address. The amount of shifting is determined by the value in a horizontal shift register 266 in control registers 111. The horizontal shift register 266 enables the horizontal down shifter 242 to shift only when the image is decimated in the horizontal direction, since otherwise pixel data is stored in storage locations associated with each horizontal address value. However, when the image is decimated in the horizontal direction, pixel data for successive pixels in the horizontal direction to be displayed, which is a selected fraction of the pixels, is stored in locations in the display memory 116 (FIG. 2) defined by successive horizontal address values, and the shifting effectively provides the required horizontal address values for the pixels to be displayed.

Since the displacement address on line 244 is arranged with the vertical address values immediately above the most significant bit of the horizontal address values, and since the number of bits comprising the horizontal address value is variable, a masking circuit 252 is provided to mask out any of the vertical address bits which the horizontal down shifter 242 may have shifted. The masking operation uses a mask from the horizontal size mask register 264 in control registers 111 (FIG. 2). A one in a bit position in the mask indicates a bit of the horizontal address, while a zero indicates a bit of the vertical address to be cleared. The mask circuit 252 essentially performs a bit-wise Boolean AND operation between the bits of the mask and the bits of the shifted address from horizontal down shifter 242 to mask out any of the vertical address bits.

Similarly, for vertical addresses, the vertical down shifter 246 shifts the displacement address on line 244 by an amount determined by the contents of a vertical shift register 247 in control registers 111. The output of the vertical down shifter 246 is masked in a mask circuit 245 by a mask in a vertical size mask register 268 in control registers 111, to mask any high-order displacement virtual address bits that are shifted into the vertical address.

The results produced by the mask circuits 252 (in the horizontal address portion) and 245 (in the vertical address portion) comprise HORIZ ADRS horizontal address signals and VERT ADRS vertical address signals 276, which constitute the remainder of the address used to identify a storage location in the memory 116.

Once the horizontal and vertical address values have been determined, they may be used to control storage in display memory 116 of the latched pixel data in the pipeline register 310 (FIG. 3). The clocking signals are coupled to the analog output portion 27 along with the video data signals 30 from the display memory.

The pixel data is sent to the video board to generate appropriate analog signals to control the display unit 28. This may be accomplished in a conventional manner and will not be described further herein.

The invention provides a number of advantages. Since the display system 23 monitors the bus 12 when locations in the system memory, which hold the image data during processing by the processor, are written to by the processor, the display system updates its copy of the image data by receiving and storing the image data that is being written to system memory, contemporaneously with storage of the same data by the system memory. This allows the display memory to be updated simultaneously with the system memory without the requiring extra operations by the processor or traffic over the bus as is often required with other systems. The invention permits the display size to be independent of the processing image size and allows the displaying of pictures that are in virtual memory. That is, since it is not necessary to store the entire picture in physical memory, the display can display decimated views of very large pictures.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A display system for connection to a bus in a digital display processing system having a system memory storing data in response to system memory addresses, said display system comprising:
   A. a display memory for storing image data;
   B. a display for receiving stored image data from said display memory and for generating a displayed image;
   C. an interface for receiving image data and address data from said bus, said address data specifying addresses in said system memory, said interface determining in response to said address data whether the image data relates to image data for an image stored in said display memory and in response thereto controlling storage of the image data in the display memory simultaneously with storage of the image data in the system memory.

2. The display system of claim 1 in which said interface comprises:
   A. an address receiver for receiving address signals from said bus;
   B. an address processor including:
      i. a range verification circuit for verifying that the address signals identify an address corresponding to the image being displayed by the display system; and
      ii. an address translator for performing a translation operation in connection with the address signals to identify a storage location in the display memory in which the image data is to be stored.

3. The display system of claim 2 in which said range verification circuit includes:
   A. a base verification circuit for determining whether the address is above a base address; and
   B. a displacement verification circuit for determining whether the address is less than a selected maximum displacement value above said base address.

4. The display system of claim 3 in which said base verification circuit includes:
   A. a base address register for storing said base address; and
   B. a subtraction circuit for determining a difference between the address from the address receiver and the base address stored in the base address register and for generating a borrow signal if the difference is negative, the borrow signal indicating that the address is below the base address.

5. The display system of claim 3 in which said displacement verification circuit comprises:
   A. a subtraction circuit for determining the difference between the address from the address receiver and the base address stored in the base address register and for generating a displacement address.
   B. a mask register for storing a mask value, the contents of the mask register having selected values identifying the selected maximum displacement value;
   C. a mask circuit for performing a masking operation in connection with the displacement address using the contents of the mask register to generate a masked displacement address; and
   D. a condition determination circuit for determining a selected condition of the masked displacement address to thereby determine whether the address is less than a selected maximum displacement value above said base address.

6. The display system of claim 5 in which the mask value stored in the mask register also identifies selected decimation information.

7. The display system of claim 2 in which said address translator includes:
   A. a base address register for storing said base address;
   B. a subtraction circuit for generating a displacement address in response to the address and a base address;
   C. a horizontal address portion for generating a horizontal address in response to the displacement address; and
   D. a vertical address portion for generating a vertical address in response to the displacement address.

8. The display system of claim 7 in which horizontal address portion comprises:
   A. a shift circuit for shifting the displacement address a selected extent to generate a shifted horizontal displacement address value; and
   B. a mask circuit for performing a masking operation in connection with the shifted horizontal displacement address value to mask selected portions of the displacement address to isolate a horizontal displacement.

9. The display system of claim 7 in which vertical address portion comprises:
A. a shift circuit for shifting the displacement address a selected extent to generate a shifted vertical displacement address value; and
B. a mask circuit for performing a masking operation in connection with the shifted vertical displacement address value to mask selected portions of the displacement address to isolate a vertical displacement.

10. The display system of claim 2 wherein said interface includes a buffer in communication with said address processor for receiving address data from said address translator prior to addressing an address in said display memory to store said image data.

11. The display system of claim 1 wherein said interface includes a buffer in communication with said bus and said display memory for receiving image data from said bus prior to storing said image data in said display memory.

12. A display driver for connection to a bus in a digital processing system having a system memory storing data in response to system memory addresses and for providing image data to a display, said display driver comprising:
A. a display memory for storing image data;
B. an interface for receiving image data and address data from said bus, said address data corresponding to addresses in said system memory, said interface determining in response to said address data whether the image data relates to image data for an image stored in said display memory and in response thereto controlling storage of the image data in the display memory simultaneously with storage of the image data in the system memory.

13. The display driver of claim 12 in which said interface comprises:
A. an address receiver for receiving address signals from said bus;
B. an address processor including:
 i. a range verification circuit for verifying that the address signals identify an address corresponding to the image being stored in said display memory; and
 ii. an address translator for performing a translation operation in connection with the address signals to identify a storage location in the display memory in which the image data is to be stored.

14. The display driver of claim 13 in which said range verification circuit includes:
A. a base verification circuit for determining whether the address is above a base address; and
B. a displacement verification circuit for determining whether the address is less than a selected maximum displacement value above said base address.

15. The display driver of claim 14 in which said base verification circuit includes:
A. a base address register for storing said base address; and
B. a subtraction circuit for determining a difference between the address from the address receiver and the base address stored in the base address register and for generating a borrow signal if the difference is negative, the borrow signal indicating that the address is below the base address.

16. The display driver of claim 14 in which said displacement verification circuit comprises:
A. a subtraction circuit for determining the difference between the address from the address receiver and the base address stored in the base address register and for generating a displacement address.
B. a mask register for storing a mask value, the contents of the mask register having selected values identifying the selected maximum displacement value;
C. a mask circuit for performing a masking operation in connection with the displacement address using the contents of the mask register to generate a masked displacement address; and
D. a condition determination circuit for determining a selected condition of the masked displacement address to thereby determine whether the address is less than a selected maximum displacement value above said base address.

17. The display driver of claim 16 in which the mask value stored in the mask register also identifies selected decimation information.

18. The display driver of claim 13 in which said address translator includes:
A. a base address register for storing said base address;
B. a subtraction circuit for generating a displacement address in response to the address and the base address;
C. a horizontal address portion for generating a horizontal address in response to the displacement address; and
D. a vertical address portion for generating a vertical address in response to the displacement address.

19. The display driver of claim 18 in which horizontal address portion comprises:
A. a shift circuit for shifting the displacement address a selected extent to generate a shifted horizontal displacement address value; and
B. a mask circuit for performing a masking operation in connection with the shifted horizontal displacement address value to mask selected portions of the displacement address to isolate a horizontal displacement.

20. The display driver of claim 18 in which vertical address portion comprises:
A. a shift circuit for shifting the displacement address a selected extent to generate a shifted vertical displacement address value; and
B. a mask circuit for performing a masking operation in connection with the shifted vertical displacement address value to mask selected portions of the displacement address to isolate a vertical displacement.

21. The display driver of claim 13 wherein said interface includes a buffer in communication with said address processor for receiving address data from said address translator prior to addressing an address in said display memory to store said image data.

22. The display driver of claim 12 wherein said interface includes a buffer in communication with said bus and said display memory for receiving image data from said bus prior to storing said image data in said display memory.

23. A method for updating image information in an image display system connected to a bus in a digital processing system having a system memory storing data in response to system memory addresses, said method comprising the steps of:
- A. receiving image data and address data from said bus, said address data specifying addresses in said system memory;
- B. determining in response to said address data whether the image data relates to image data for an image stored in said image display system; and
- C. controlling storage of the image data in the image display system in response to said determination simultaneously with storage of the image data in the system memory.

24. The method of claim 23 wherein said step of determining whether the image data relates to image data stored comprises the steps of:
- A. verifying that address signals identify an address corresponding to the image being stored by the image display system; and
- B. performing a translation operation in connection with the address signals to identify a storage location in the image display system in which the image data is to be stored.

25. The method of claim 24 wherein said step of address verification comprises the steps:
- A. determining whether the address is above a base address; and
- B. determining whether the address is less than a selected maximum displacement value above said base address.

26. The method of claim 25 in which said step of determining whether said address is above a base address comprises the steps of:
- A. storing said base address; and
- B. determining a difference between the address from the bus and the stored base address and generating a borrow signal if the difference is negative, the borrow signal indicating that the address is below the base address.

27. The method of claim 25 in which said step of determining whether the address is less than a selected maximum displacement value comprises the steps of:
- A. subtracting the address from the stored base address;
- B. generating a displacement address;
- C. storing a mask value identifying the selected maximum displacement value;
- D. performing a masking operation in connection with the displacement address using the mask value to generate a masked displacement address; and
- E. determining a selected condition of the masked displacement address to thereby determine whether the address is less than a selected maximum displacement value above said base address.

28. The method of claim 24 wherein said step of performing a translation operation comprises the steps of:
- A. storing said base address;
- B. generating a displacement address in response to the address and a base address;
- C. generating a horizontal address in response to the displacement address; and
- D. generating a vertical address in response to the displacement address.

29. The method of claim 28 wherein said step of generating a horizontal address comprises the steps of:
- A. shifting the displacement address a selected extent to generate a shifted horizontal displacement address value; and
- B. performing a masking operation in connection with the shifted horizontal displacement address value to mask selected portions of the displacement address to isolate a horizontal displacement.

30. The method of claim 28 wherein the step of generating a vertical address comprises the steps of:
- A. shifting the displacement address a selected extent to generate a shifted vertical displacement address value; and
- B. masking operation in connection with the shifted vertical displacement address value to mask selected portions of the displacement address to isolate a vertical displacement.

31. The display system of claim 24 wherein, following the step of address translation, said address is stored in a buffer prior to using said address to select an address in said display memory to store said image data.

32. The method of claim 23 wherein said step of receiving image data from said bus includes a step of storing said image data in a buffer prior to storing said image data in said display memory.

* * * * *